Figures 1, 2, 3:
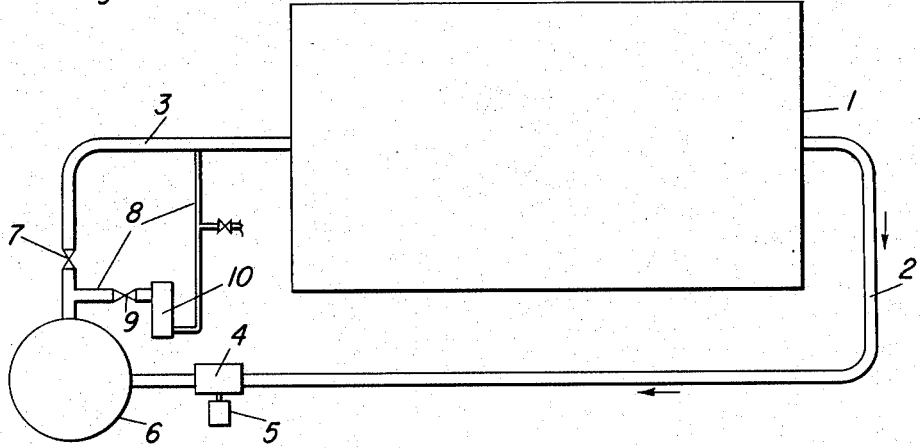

INVENTOR.
Frank F. Lindstaedt
BY
Att'y

United States Patent Office 2,887,444
Patented May 19, 1959

2,887,444

PROCESS OF AND MEANS FOR CHLORINATING SWIMMING POOLS OR THE LIKE

Frank F. Lindstaedt, San Anselmo, Calif., assignor to George H. Graves and George W. Gray Application March 25, 1957, Serial No. 648,277

5 Claims. (Cl. 204—152)

The present invention relates to improvements in a process of and means for chlorinating swimming pools or the like, and its principal object is to greatly simplify the chlorination of the water, to reduce the expense so that it becomes negligible, and to maintain the available chlorine content of the water in the pool at a substantially constant level, best adapted for the purposes of the swimming pool and calculated to produce the desired disinfection without becoming injurious to the physical well-being of the swimmer.

The invention may also be readily applied for disinfecting dairies, food processing plants, laundry water, and the like.

Heretofore, it has been customary to periodically add chlorine to the water of the swimming pool. For example, if a pool had a 15,000 gallon capacity, it was necessary to add one-half a gallon of chlorine solution to the pool each day, the solution costing about sixty cents per gallon, and containing 5% available chlorine. Additionally, every two weeks, the pool was treated with four or five gallons of 5% available chlorine solution.

By this practice, it was hoped that a minimum value of 0.1 to 0.4 part per million (p.p.m.) available chlorine would be maintained in the water.

Theoretically, the one-half gallon of 5% available chlorine solution added to 15,000 gallon swimming pool would make a finished solution of 3.33 parts per million. This solution is too strong, as chlorine is quite irritating to the eyes.

However, due to the presence of organic matter in the water, and also to the presence of sunlight, the available chlorine quickly drops, so that, many times, if there are quite a number of swimmers using the pool, the available chlorine drops rapidly, and it may be necessary to add more hypochlorite or chlorine to bring the available chlorine to 0.2–0.4 part per million.

If the available chlorine is higher than 0.5 to 0.6 part per million, it is irritating to the eyes of the swimmer. Therefore, it is desirable to keep the available chlorine between 0.1 and 0.5 part per million.

From the above discussion it is apparent that intermittent application of sodium or calcium hypochlorite or chlorine to the water of a swimming pool is quite inconvenient.

Most swimming pools are provided with a filtering unit which circulates the water through a filter to remove leaves, dirt, silt and other foreign material which has entered the pool. The filtering unit is usually run from four to fourteen hours daily.

At the prevailing cost for available chlorine, the expense is about $13.00 per month to maintain a minimum available chlorine content. Also, considerable effort is required in storing bottles and in emptying them into the pool, and occasionally a bottle is dropped and broken near or at the pool, and effort is required to clean it up.

Some pools have chlorinating equipment which uses dry chlorine gas which is fed through metering machinery. However, the use of such machinery has disadvantages. Occasionally leaks develop, and in spite of everything, if there is any corrodable material within several feet of the pool, the same will be damaged. Cases are of record, where persons have been severely injured due to escaping chlorine gas.

Some swimming pool owners use calcium hypochlorite, which has the advantage of being lower priced, but has the disadvantage of gradually settling down calmium deposits on the walls and floor of the swimming pool, which is difficult to remove. Dry calcium hydrochlorite may be hand spread or sprinkled over the pool, or may be placed in bags to be drawn through the water until the calcium hypochlorite is dissolved, whereupon the water is mixed into the pool at the filter outlet system or by mixing it in with paddles.

In the present invention, I propose to provide a much simpler method of chlorinating a swimming pool. My method is made to work substantially automatically, as a part of the pumping system, to extend the chlorination periods over many hours to avoid excessive or insufficient chlorination and to substantially keep the chlorine charge at an even level.

It also provides a chlorination system the operation of which is very inexpensive, so as to render the cost of the chlorination negligible.

Further objects and advantages of my chlorination system will be disclosed as the specification continues, and the new and useful features of the invention will be fully defined in the claims attached hereto.

The preferred form of my invention is illustrated in the accompanying drawing forming part of this application, in which:

Figure 1 is a diagrammatic view illustrating my invention;

Figure 2, a vertical section through an electrolytic cell used in my invention; and Figure 3, a section taken along line 3—3 of Figure 2.

While I have shown only the preferred form of my invention, it should be understood that various changes or modifications may be made within the scope of the claims hereto attached, without departing from the spirit of the invention.

Referring to the drawing in detail, my invention includes generally a swimming pool 1, which may be of any suitable size and which for the purpose of the present description may be said to have a capacity of 15,000 gallons.

The pool is provided with a conventional circulating system comprising an outlet conduit 2, intake conduit 3 and a pump 4 connecting the conduits, so as to pump water from one end of the pool to the other end, the pump being suitably driven by an electric motor 5.

Downstream of the pump, a filter 6 is provided which is intended to catch leaves, dirt, and other foreign material which may enter the pool. A valve is provided in the circulating system, as at 7. This pumping system is conventional in character.

In carrying out my system, I provide a by-pass 8 for the conduit 3, downstream of the filter, this by-pass being controlled by a valve 9 and having an electrolytic cell 10 incorporated therein, with a D.C. rectifier for passing a current through the cell and any electrolyte contained therein.

The cell 10 comprises, in its principal features, a pair of graphite plates 11—12, of similar shape, each plate being rectangular in shape and twelve inches wide, thirteen inches long and seven-eighths of an inch thick. The plates are arranged in face to face relation and are spaced approximately one-tenth of an inch by means of an interposed border gasket 13.

The inner or confronting faces of the plates are formed with registering grooves 14—15, the grooves extending parallel to the side edges of the plates, in close proximity thereto, and extending through the major portion of the length of the plates, leaving enough space for the border gaskets.

The grooves are relatively shallow, about seven-eighths of an inch wide and one-quarter of an inch deep, and one of the grooves in one of the plates is formed with a central port 16 connecting with the intake of the by-pass, while the non-registering groove in the other plate is formed with a similar central port 17 connecting into the by-pass outlet.

Thus, as water is pumped from the pool through the circulating system, a portion of the same is by-passed to pass through the cell 10, entering at 16, spreading through the grooves laterally and flowing in a thin sheet between the plates toward the other set of grooves, for final discharge through the other port 17.

The amount of water to be passed through the cell can be adjusted by operation of the valves 7 and 9, and the cooperative sets of grooves in the plates of the cell serve to insure a uniform flow of the water through the cell in the form of a thin sheet, subject to the charge of the direct current.

In carrying out my process, I first add a certain amount of common salt (sodium chloride) to the water of the pool to provide a solution of ¼% to 3%, or more. Then, as the salt solution is circulated through the pumping system illustrated in Figure 1, a part of the filtered water is by-passed through valve 9 and through the electrolytic cell where part of the salt is converted into sodium hypochlorite by the direct current supplied to the cell.

As an example, assuming that one-half of one percent of salt is used in the water of the pool; that an area of ninety square inches of electrolytic surface is available and the graphite or carbon plates are about one-tenth of an inch apart:

When I apply 8 volts at 70 amperes (560 watts) and have 150 gallons of saline solution per hour flowing through the cell, I find about twenty-five parts per million of available chlorine in the effluent.

The effluent of 150 gallons per hour, if diluted twenty-five times, would result in 3,750 gallons of water with one part per million of available chlorine, and if still further diluted to 0.4 part per million of available chlorine, it would supply 9,375 gallons of water with the desired proportion of available chlorine.

If the chlorinating system supplies the desired amount of available chlorine to 9,375 gallons of water in one hour, it will do the same to 15,000 gallons in ninety-six minutes.

Thus, the cost of supplying a 15,000 gallon pool with 0.4 part per million available chlorine may be estimated as follows: Assuming the cost of electricity as being 3.2 cents per kilowatt hour, this would be the equivalent of 1.7 cents for 560 watts per hour, and 2.7 cents for 560 watts for ninety-six minutes.

Since this time is sufficient to supply 15,000 gallons with 0.4 part per million of available chlorine, it is apparent that the total cost in electricity of charging the entire 15,000 gallons to the desired degree would only be 2.7 cents.

If a stronger solution is desired in the pool, the cost is still further reduced.

I find, for instance, that if I use a 1% solution (saline) and pass it through the same cell at 150 gallons per hour, I secure an effluent with about forty-eight parts per million of available chlorine. This, if diluted to 0.4 part per million would supply the desired percentage of chlorine to 18,000 gallons in one hour, or to 15,000 gallons in a fifty minute run, with a total cost of electricity of 1.417 cents for providing 15,000 gallons with 0.4 part per million of available chlorine.

Using 2% sodium chloride, the cost of electricity would be still further reduced.

While the electrical efficiency is relatively low at the lower concentrations of salt in the water, it is still preferable to use the lower saline solution, from an economic standpoint.

When the sodium solution is passed through the electrolytic cell, the following reactions occur:

Equation 1

$$2NaCl \rightarrow Cl_2 + 2NaOH = NaClO + H_2O$$

It will be noted that only one-half of the NaCl is converted to NaClO. This is because a number of side reactions occur. Not all of the hydroxyl ions combine as equation 1; some migrate to the anode and are discharged as:

Equation 2

$$2OH^- - 2\theta = H_2O + O$$

The oxygen escapes at the anode. Low temperature tends to decrease this reaction. Some of the sodium hypochlorite disassociates into $Na^+ + ClO^-$ ions. Some of the $ClO^-$ ions will reach the anode and be discharged and the free hypochlorite ions will combine with water.

Equation 3

$$ClO^- - \theta = ClO$$

Equation 4

$$6ClO + 3H_2O = 4HCl + HClO_3 + 1\frac{1}{2}O_2$$

The salt solutions have a pH of 7 to 7.5 in the region of the anode. The $OH^-$ concentration is low, but the $ClO^-$ ions formed in the bulk of the electrolyte can easily migrate to the anode region of low $OH^-$ concentration, and hydrolysis then takes place.

Equation 5

$$ClO^- + H_2O = HClO + OH^-$$

Due to the high concentration of chlorine near the anode, more hypochlorous acid will be present than in other parts of the electrolyte, and this hypochlorous acid reacts with the sodium hypochlorite to form chlorate and hypochloric acid.

Equation 6

$$NaClO + 2HClO = 2HCl + NaClO_3$$

The hydrochloric acid produces more hydrochlorous acid.

Equation 7

$$HCl + NaClO = NaCl + HClO$$

At the cathode hypochlorite is attached by the hydrogen.

Equation 8

$$NaClO + 2H = H_2O + NaCl$$

Now, Equation 8 is largely off-set by introducing enough calcium chloride ($CaCl_2$) into the water so that on hydrolysis in the cell, a thin layer of calcium hydroxide is formed over the surface of the cathode which acts as a diaphragm at the anode and prevents formation of chlorate. While I have shown the side reactions that take place, these are largely minimized by the addition of calcium chloride to the electrolyte, plus having a high rate of flow through the cell.

Experiments have shown that if salt only, is added to the water and then passed through the electrolytic cell, the rate of decomposition of the hypochlorite is quite rapid.

For instance, ½% of salt in the water was run through the electrolytic cell at such a rate that twenty parts per million of available chlorine was produced. After standing in an open beaker for twenty-four hours, no available chlorine was left at the end of the period.

When using ½% of salt in water, and adding 1.9 grams of sodium tripoly-phosphate and 1.9 grams of sodium biborate to the gallon, and running this solution through the electrolytic cell, eighteen parts per million of available chlorine was produced. After standing for ninety-six hours, one part per million of available chlorine remained.

When using ½% of salt in water and adding .2% of sodium biborate to the same and running this solution through the electrolytic cell, fifteen parts per million of available chlorine was produced. After standing in an open beaker for one hundred and twenty hours there still remained 0.1 part per million available chlorine.

Tests have shown that the following salts, also, have good stabilizing effect, namely, sodium dibasic phosphate, sodium pyrophosphate and sodium hexametaphosphate. These borates and phosphates are generally classified as buffering agents.

The high rate of flow sets up turbulence not found in ordinary cells, namely seventy-five to one hundred and fifty gallons per hour per ninety square inches of electrolytic surface. This causes Equation 1 to dominate.

It should be observed that in my process, I use low concentration of sodium chloride, with relatively low electrical efficiency, whereas in standard practice a strong salt solution, from 6% to 24% of sodium chloride is used, or even fused salt is electrolysed.

I claim:

1. The method of chlorinating a confined relatively large body of water which comprises the steps of adding sodium chloride to the body of water to form a low concentration saline solution, removing a portion of the saline solution from the body of water and conducting it in a stream back to said body of water, removing a portion of said stream and subjecting it to electrolysis to generate chlorine, then returning said last mentioned portion to said stream, and controlling the portion removed from said stream to maintain the desired chlorine content in the body of water.

2. The method as defined in claim 1 including the step of subjecting said stream to a filtering process.

3. The method as defined in claim 1 including the step of adding a buffering agent to the solution.

4. The method as defined in claim 3 wherein the buffering agent is selected from a group comprising sodium trypolyphosphate, sodium biborate, sodium dibasic phosphate, sodium pyrophosphate and sodium hexametaphosphate.

5. In combination with a swimming pool adapted to have a body of salt water confined therein, a by-pass conduit for the swimming pool having a pump therein for circulating water through the by-pass conduit and the pool, a branch conduit for the by-pass conduit downstream of the pump, an electrolytic cell in the branch conduit for liberating chlorine from the salt water passing therethrough, and control means for diverting a desired amount of salt water through the branch conduit.

References Cited in the file of this patent

UNITED STATES PATENTS

| | | |
|---|---|---|
| 1,277,378 | Case | Sept. 3, 1918 |
| 1,996,799 | Evans | Apr. 9, 1935 |
| 2,385,903 | Winkelmann | Oct. 2, 1945 |
| 2,399,289 | Negus | Apr. 30, 1946 |
| 2,541,799 | White | Feb. 13, 1951 |
| 2,658,033 | Ferris | Nov. 3, 1953 |

FOREIGN PATENTS

| | | |
|---|---|---|
| 15,384 | Great Britain | of 1887 |